ent Office 3,008,803
Patented Nov. 14, 1961

3,008,803
CRYSTALLINE ZEOLITE B
Robert M. Milton, Buffalo, N.Y., assignor to Union
Carbide Corporation, a corporation of New York
No Drawing. Filed July 17, 1959, Ser. No. 827,680
11 Claims. (Cl. 23—113)

This invention relates to an adsorbent of the molecular sieve type and, more particularly, to a synthetic crystalline form of sodium alumino silicate, its derivatives, and methods of making and activating these adsorbents.

It is the principal object of the invention to provide an adsorbent of the molecular sieve type having improved adsorbing properties. A further object is to provide a novel crystalline metal alumino silicate suitable for use as an adsorbent. Still another object of the invention is to provide a synthetic material having unique adsorptive properties and a high adsorptive capacity. Another object of the invention is to provide a convenient and efficient method of making and activating the novel adsorbent of the invention.

Naturally occurring hydrated metal alumino silicates are called zeolites. The synthetic adsorbents of the invention have compositions similar to some of the natural zeolites. Accordingly, the term "zeolite" would appear to be appropriately applied to the adsorbents of the invention. There are, however, significant differences between the synthetic and natural materials. To distinguish the one from the other the material of the invention, synthetic crystalline sodium alumino silicate and its derivatives, will be designated hereinafter by the term "zeolite B."

Certain adsorbents, including zeolite B, selectively adsorb molecules on the basis of the size and shape of the adsorbate molecule and are called molecular sieves. Molecular sieves have an adsorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. The common adsorbents, charcoal and silica gel, for example, do not exhibit molecular sieve action.

Zeolite B consists basically of a three-dimensional framework of $SiO_4$ and $AlO_4$ tetrahedra. The tetrahedra are cross linked by the sharing of oxygen atoms so that the ratio of oxygen atoms to the total of the aluminum and silicon atoms is equal to two or $O/(Al+Si)=2$. The electro-valence of each tetrahedra containing aluminum is balanced by the inclusion in the crystal of a cation, for example an alkali or alkaline earth metal ion. This balance may be expressed by the formula $$2Al/(Ca, Sr, Ba, 2Na, 2K)=1$$

One cation may be exchanged for another by ion exchange techniques which are described below. The spaces between the tetrahedra are occupied by water molecules prior to dehydration.

Zeolite B may be activated by heating to effect the loss of the water of hydration. The dehydration results in crystals interlaced with channels of molecular dimensions that offer very high surface areas for the adsorption of foreign molecules. These interstitial channels will not accept molecules much larger than water or that have a maximum dimension of the minimum projected cross-section in excess of about 3.0 A. Factors influencing occlusion by activated zeolite B crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite B are quite as important as the adsorptive or positive adsorption characteristics. For instance, if water and ethyl alcohol are to be separated, it is as essential that the crystals refuse the ethyl alcohol as it is that they adsorb the water.

A feature of the invention is the relatively simple process by which zeolite B may be prepared. Although there are a number of cations that may be present in zeolite B it is preferred to formulate or synthesize the sodium form of the crystal since the reactants are readily available and water soluble. The sodium in the sodium form of zeolite B may be easily exchanged for other cations as will be shown below. Essentially the preferred process comprises heating a proper mixture, in aqueous solution, of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging from one hour to 90 hours or longer. The product which crystallizes from the hot-mixture is filtered off, washed with distilled water until the effluent wash water in equilibrium with the zeolite has a pH of from about 9 to 12. The material, after activation as by drying is ready for use as a molecular sieve.

Zeolite B may be distinguished from other zeolites and silicates on the basis of its X-ray powder diffraction pattern. The X-ray patterns for several of the ion exchanged forms of zeolite B are described below. Other characteristics that are useful in identifying zeolite B are its composition and density.

The basic formula for all crystalline zeolites where "M" represents a metal and "n" its valence may be represented as follows:

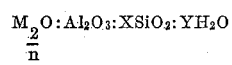

In general a particular crystalline zeolite will have values for X and Y that fall in a definite range. The value X for a particular zeolite will vary somewhat since the aluminum atoms and the silicon atoms occupy essentially equivalent positions in the lattice. Minor variations in the relative numbers of these atoms do not significantly alter the crystal structure or physical properties of the zeolite. For zeolite B, numerous analyses have shown that an average value for X is about 3.5. The X value falls within the range $3.5 \pm 1.5$.

The value of Y is not necessarily an invariant for all samples of zeolite B particularly among the various ion exchanged forms of zeolite B. This is true because various exchangeable ions are of different size, and, since there is no major change in the crystal lattice dimensions upon ion exchange, more or less space should be available in the pores of the zeolite B to accommodate water molecules.

The average Y value was determined by heating hydrated sodium zeolite B at 500° C. under 0.1 millimeter of mercury pressure and determining by weight differential the amount of water lost. The average value for Y thus determined was 5.1. The value of Y can vary from 5.1 to essentially zero. The maximum value of Y has been found to be about 6 in calcium zeolite B.

In zeolite B synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one.

The composition for zeolite B lies in the range of $$\frac{M_2O}{n} \Big/ Al_2O_3 = 1.0 \pm 0.2$$

where "M" represents a metal and "$n$" its valence. A typical analysis for a thoroughly washed sodium zeolite B expressed in terms of oxide, is $$0.97Na_2O:1.0Al_2O_3:3.04SiO_2:5.1H_2O$$

Thus the formula for zeolite B may be written as follows:

$$1.0 \pm 0.2 \frac{M_2O}{n}:Al_2O_3:3.5 \pm 1.5SiO_2:YH_2O$$

In this formula "M" represents a metal, "$n$" its valence, and "Y" may be any value up to 6 depending on the identity of the metal and the degree of dehydration of the crystal.

The pores of zeolite B are normally filled with water and in this case, the above formula represents the chemical analysis of zeolite B. When other materials as well as water are in the pores, chemical analysis will show a lower value of Y and the presence of other adsorbates. The presence in the crystal lattice of materials volatile at temperatures below about 600° C. does not significantly alter the usefulness of zeolite B as an adsorbent since the pores are usually freed of such volatile materials during activation.

The apparent density of a fully hydrated sample of sodium zeolite B was determined by the flotation of crystals in liquid of appropriate densities. The technique and liquids used are discussed in an article entitled "Density of Liquid Mixture" appearing in Acta Crystallorgraphica, 1951, vol. 4, page 565. The apparent density thus determined is 2.01 grams per cubic centimeter. The accuracy of this determination is within 0.1 gram per cubic centimeter.

In making the sodium form of zeolite B, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite; however, mixing during formation and crystallization has not been found detrimental. The initial mixing of ingredients is conveniently done at room temperature but this is not essential.

A crystallization temperature of about 100° C. has been found to be particularly advantageous in this process. The temperature is easy to maintain. It is high enough to effectively promote the reaction and yet low enough to yield crystals with a high water content which upon activation, have a high adsorptive capacity.

Satisfactory results have been obtained with the temperature of the reaction as high as about 150° C. or as low as 75° C., the pressure being atmospheric or at least that corresponding to the vapor pressure of water in equilibrium with the mixture at the higher temperature. Any suitable heating apparatus, for instance an oven, sand bath, oil bath, or jacketed autoclave may be used. For convenience, in laboratory work, glass vessels containing the reactants are held immersed in a bath of boiling water giving a temperature of about 100° C. In quantity production, steam jacketed vessels offer a convenient means of controlling the temperature. For temperatures between 75° C. and 150° C., increasing the reaction temperature increases the rate of reaction and decreases the reaction period. For example, sodium zeolite B of high purity in good yields is obtained in 16 hours at 100° C. and in as little as 6 hours at 120° C. Once the zeolite crystals have formed, they maintain their structure and holding the reaction temperature for a longer time than is necessary for the maximum yield of crystals does no harm. For instance, zeolite B which may be completely crystallized within sixteen hours at 100° C. can remain in contact with the mother liquor at 100° C. for an additional 50 to 100 hours with no apparent change in yield or crystal structure.

After the reaction period, the zeolite crystals are filtered off. The reaction magma may be filtered at the reaction temperature if desired but hot magmas are preferably cooled to room temperature before filtering. The filtrate, or mother liquor, may be reused after enrichment with the proper amounts of reactants to give a properly proportioned reactant mixture. The mass of zeolite crystals is washed (preferably with distilled water and conveniently in the filter) until the effluent wash water, in equilibrium with the zeolite has a pH of between 9 and 12.

Thereafter, the crystals are dried, conveniently in a vented oven at a temperature of between about 25° C. and 150° C. For X-ray and chemical analysis, this drying is sufficient. In practical use, there need be no separate drying step since the zeolites will dry as they are activated. The individual crystals of the synthetic zeolite B have a size in the range of 0.01 micron to 100 microns.

In the synthesis of zeolite B, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite B.

Specific examples of the production of the sodium form of zeolite B are given in Table I below. The mixtures and treatments described resulted in essentially pure crystalline zeolite B. In run 2 and subsequent runs the term "Solution S" refers to a water solution of sodium silicate containing approximately 7.5 percent by weight $Na_2O$ and 25.8 percent by weight $SiO_2$. "Solution R" is a water solution of sodium silicate containing about 20 percent by weight $Na_2O$ and 32 percent by weight $SiO_2$. Sodium silicate N and water glass are water solutions of sodium silicate containing about 9 percent by weight $Na_2O$ and 29 percent by weight $SiO_2$.

TABLE I

| Ex. | Reactants | Temp., °C. | Duration, hrs. | Ratio of oxides | | |
|---|---|---|---|---|---|---|
| | | | | $SiO_2/Al_2O_3$ | $Na_2O/SiO_2$ | $H_2O/Na_2O$ |
| 1 | 149 gm. water glass, 30.7 NaAlO$_2$+75 cc. H$_2$O. | 100 | 65 | 3.9 | 0.54 | 24 |
| 2 | 125 gm. "Solution S," 25 gm. NaAlO$_2$+75 gm. H$_2$O. | 100–120 | 47 | 3.8 | 0.51 | 25 |
| 3 | 62.5 gm. "Solution S," 12.5 gm. NaAlO$_2$+75 gm. H$_2$O. | 100 | 81 | 3.8 | 0.51 | 48 |
| 4 | 106 gm., "Solution R," 5 gm. NaAlO$_2$+175 cc. H$_2$O. | 100 | 90 | 20 | 0.61 | 37 |
| 5 | 91.5 gm. "Solution S," 10 gm. NaAlO$_2$+14.5 cc. H$_2$O. | 100 | 47 | 7.0 | 0.38 | 29 |
| 6 | 200 gm. Sodium Silicate N, 10.68 gm. NaAlO$_2$, 13.38 gm. NaOH+150 gm. H$_2$O. | 100 | 52 | 20 | 0.55 | 30 |
| 7 | 1000 gm. Water glass, 109 gm. NaAlO$_2$+775 cc. H$_2$O. | 100 | 48 | 10 | 0.41 | 39 |

The chemical composition of the products of Examples 6 and 7, as determined by elemental analysis, were as follows:

| | Na$_2$O | SiO$_2$ | Al$_2$O$_3$ | H$_2$O |
|---|---|---|---|---|
| Example 6 | 1.04 | 4.63 | 1.00 | 5.27 |
| Example 7 | 1.02 | 5.01 | 1.00 | 4.28 |

When the silica source is sodium silicate, silica gel, or silicic acid and the reaction temperature is in the range of 75° C. to 150° C., substantially pure zeolite B may be obtained from reactant mixtures whose compositions expressed in terms of oxide mol ratios fall within the following range:

Na$_2$O/SiO$_2$ _____ 0.38–0.61
SiO$_2$/Al$_2$O$_3$ _____ 3.3–20
H$_2$O/Na$_2$O _____ 10–50

Zeolite B may also be obtained in small amounts from many other aqueous sodium aluminosilicate reactant mixtures. As a result, zeolite B is often produced as an impurity in the synthesis of other species of crystalline zeolites from a wide variety of reactant mixtures.

Zeolite B, either in pure form or admixed with other crystalline zeolites may be produced when aqueous sodium aluminosilicate reactant mixtures which ordinarily yield other crystalline zeolites are maintained under process conditions for extreme lengths of time. This may be illustrated by Examples 8 and 9 below. The reactant mixtures of these examples when maintained at 100° C. for about 6 hours yield substantially pure zeolite A, a crystalline zeolite described in detail in U.S. Patent 2,882,243. However, under the extreme conditions of Example 8 (100° C. for 119 hours) and Example 9 (100° C. for 186 hours) substantially pure zeolite B was produced.

Example 8

Four grams of aluminum hydroxide containing 63.7 weight-percent Al$_2$O$_3$ and 36.3 weight-percent H$_2$O, six grams of sodium hydroxide (containing 77.5 weight-percent Na$_2$O), and 3.94 grams of silicic acid containing 76.5 weight-percent SiO$_2$ were placed in a reaction vessel. To this was added 63.6 grams of distilled water. The resultant mixture, which had a molar composition of Na$_2$O/SiO$_2$=1.5, SiO$_2$/Al$_2$O$_3$=2, H$_2$O/Na$_2$O=50 was left as a heterogeneous system. The reaction vessel was placed in a steam bath at 100° C. and a stirring rod placed in the vessel. The mixture was stirred for 48 hours, and then maintained at 100° C. without agitation for an additional 71 hours. The material was then washed to a pH of 10.0. The powder was dried at 100° C. The product was identified as sodium zeolite B by means of its X-ray diffraction pattern. Chemical analysis indicated a product composition of $$0.73Na_2O:1.00Al_2O_3:2.17SiO_2:3.88H_2O$$

Example 9

A reactant mixture having a weight ratio of 0.215 sodium hydroxide (containing 77.5 weight-percent Na$_2$O), 1.00 aluminum hydroxide containing 63.7 weight-percent Al$_2$O$_3$ and 36.3 weight-percent H$_2$O, and 2.78 water glass, containing 29.2 weight-percent SiO$_2$, 9.1 weight-percent Na$_2$O+61.3 weight-percent H$_2$O was used in this experiment. Enough water was used to dissolve the aluminum hydroxide and sodium hydroxide. This solution was added to the sodium silicate. The resultant mixture, which had a molar composition of Na$_2$O·Al$_2$O$_3$·2SiO$_2$ was stirred until homogeneous. The reaction vessel was sealed and heated at 100° C. for a period of 186 hours. The product was identified as sodium zeolite B.

In producing zeolite B it is preferred to use the reactant mixtures whose compositions fall within the range described hereinabove with the necessary silica sources and temperatures. Such conditions consistently result in high yields of substantially pure zeolite B. When the reactant composition is within this range, the conditions most preferred are a temperature of about 100° C. and a crystallization of about 16–20 hours.

As stated above, the silica source is important when reactant mixture compositions falling within the preferred range are employed and preferred silica sources as listed hereinabove. The reason for the preference will be apparent from the following example comparing sodium silicate and aqueous colloidal silica sol as the source of silica. Colloidal silica sols tend to form zeolite species other than zeolite B. For example, two reactant mixtures designated A and B each having the composition $$0.55Na_2O/SiO_2:20SiO_2/Al_2O_3:30H_2O/Na_2O$$

were prepared and both were maintained at about 100° C. for about 50 hours. Mixture A, in which the source of silica was sodium silicate, yielded substantially pure zeolite B. Mixture B, in which the silica source was an aqueous colloidal silica sol, yielded another crystalline zeolite and substantially no zeolite B.

The adsorbents contemplated herein include not only the sodium form of zeolite B as synthesized from a sodium-aluminum-silicate-water system with sodium as the exchangeable cation, but also crystalline materials obtained from such a zeolite by partial or complete replacement of the sodium ion with other cations. The sodium cations can be replaced, in part or entirely, by ion exchange with other monovalent or divalent cations, such as hydrogen and calcium, by metal ions in group I of the periodic table such as lithium, and by group II metal ions such as magnesium.

The spatial arrangement of the aluminum, silicon, and oxygen atoms which make up the basic crystal lattice of the zeolite, although essentially unchanged, may be altered somewhat by partial or complete substitution of other cations for the sodium ions. The X-ray patterns of the ion exchanged forms of zeolite B while showing the same principal lines as sodium zeolite B may also show slight shifts in line positions, relative intensities, and in some cases line splitting. These variations are attributable to changes in lattice parameters since the cations may vary in size and number as does the ratio of SiO$_2$ to Al$_2$O$_3$. The small differences in X-ray patterns of the different forms of zeolite B in no way affect the accuracy or certainty with which the materials can be identified by their X-ray patterns as a form of zeolite B.

Ion exchange of the sodium form of zeolite B (Na$_2$B) or other forms of zeolite B may be accomplished by conventional ion exchange methods. A preferred continuous method is to pack zeolite B into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, a water solution of an acid such as hydrochloric acid may be used as the exchanging solution. For sodium exchange, a water solution of sodium chloride or sodium hydroxide is a suitable exchange medium. Other satisfactory reagents for lithium, magnesium, ammonium, nickel, potassium, strontium, zinc, or silver exchange, are suitable water solutions of the chlorides, nitrates, or hydroxides of these cations.

In a typical case of batch-wise exchange, 25 grams of sodium zeolite B ($Na_2B$) and 200 cc. of distilled water were mixed in a beaker. To this were added 1088 cc. of a 0.1 N water solution of hydrochloric acid and the mixture stirred. Hydrogen ions replaced 46 percent of the sodium ions in the zeolite B.

In an example of column exchange, 31.6 grams of sodium zeolite B were placed in a glass tube of about 2 centimeters diameter. The zeolite B extended to a height of about 13.5 centimeters in the tube. Then 1370 cc. of a 0.1 N water solution of calcium chloride were passed through the tube. The calcium ions replaced 62 percent of the sodium ions in the ratio of one calcium ion for two sodium ions.

More complete calcium exchanges was obtained by placing 5 grams of sodium zeolite B in 500 cc. of a 0.05 M water solution of calcium chloride. The mixture was held at 100° C. and stirred for just under one hour. The calcium ions replaced 89 percent of the sodium ions.

Among the ways of identifying zeolite B and distinguishing it from other zeolites and other crystalline substances, the X-ray powder diffraction pattern has been found to be a useful tool. In obtaining the X-ray powder diffraction patterns, standard techniques were employed. The radiation was the K-alpha doublet of copper, and a Geiger counter spectrometer with a strip chart pen recorder was used. The peak heights, I and the positions as a function of $2\theta$, where $\theta$ is the Bragg angle, were read from the spectrometer chart. From these, the relative intensities, $$\frac{100 I}{I_0}$$

where $I_0$ is the intensity of the strongest line or peak, and $d$(obs), the interplanar spacing in A, corresponding to the recorded lines were calculated.

X-ray powder diffraction data for sodium zeolite B ($Na_2B$), an 89 percent exchanged calcium zeolite B (CaB), a 55 percent exchanged zinc zeolite B (ZnB), a 31 percent exchanged magnesium zeolite B (MgB), and a lithium zeolite B ($Li_2B$) are given in Table II. The table lists the 100 $I/I_0$ and the $d$ value in A. for the observed line for the different ion exchanged forms of zeolite B. The X-ray patterns indicate a cubic unit cell of $a_0$ of 10.0 A.±0.2 A. for the sodium, magnesium and zinc zeolite B, and a tetragonal unit cell in which the $a$-axis is 10.00 A.±0.08 A. and the $c$-axis is 10.05 A.±0.25 A. for the lithium and calcium zeolite B. In a separate column are listed the sum of the squares of the Miller indices ($h^2+k^2+l^2$) for the cubic unit cell and the Miller indices ($h, k, l$) for the tetragonal unit cell that corresponds to at least the major observed lines in the X-ray diffraction patterns. The $a_0$ values, or $a$ and $c$ values, for each particular zeolite and the estimated errors in reading the position of an X-ray peak on the spectrometer chart are also tabulated. The indicated precision of the $d$ values for Zn/B apply to all the $d$ values in Table II.

TABLE II

| ($h^2+k^2+l^2$) | $Na_2B$ | | MgB | | ZnB | |
|---|---|---|---|---|---|---|
| | 100 $I/I_0$ | $d$ (in A.) | 100 $I/I_0$ | $d$ (in A.) | 100 $I/I_0$ | $d$ (in A.) |
| 2 | 74 | 7.10 | 85 | 7.09 | 66 | 7.10 ±0.01 |
| 3 | | | | | | |
| 4 | 41 | 5.02 | 48 | 5.01 | 56 | 5.02 ±0.01 |
| 5 | | | 18 | 4.506 | 42 | 4.493±0.01 |
| 6 | 69 | 4.101 | 64 | 4.101 | 82 | 4.103±0.004 |
| 8 | | | 15 | 3.344 | 17 | 3.349±0.004 |
| 9 | | | | | | |
| 10 | 100 | 3.176 | 100 | 3.173 | 100 | 3.177±0.002 |
| 11 | | | 9 | 3.024 | 14 | 3.028±0.002 |
| 12 | 7 | 2.899 | | | 5 | 2.899±0.002 |
| 13 | | | 8 | 2.782 | 4 | 2.784±0.002 |
| 14 | 56 | 2.684 | 48 | 2.681 | 58 | 2.683±0.002 |
| 16 | 5 | 2.518 | 4 | 2.514 | 7 | 2.514±0.002 |
| 17 | | | 8 | 2.432 | 8 | 2.435±0.002 |
| 18 | 10 | 2.366 | 2 | 2.366 | 3 | 2.369±0.002 |
| 19 | | | 2 | 2.303 | 2 | 2.304±0.002 |
| 20 | 2 | 2.246 | | | 2 | 2.244±0.002 |
| 21 | | | 6 | 2.189 | 10 | 2.192±0.001 |
| 22 | 1 | 2.142 | 2 | 2.139 | 3 | 2.141±0.001 |
| 24 | 4 | 2.051 | | | 1 | 2.047±0.001 |
| 25 | | | | | | |
| 26 | 11 | 1.971 | 8 | 1.969 | 10 | 1.970±0.001 |
| 27 | | | 3 | 1.932 | 4 | 1.933±0.001 |
| 29 | | | 4 | 1.863 | 8 | 1.866±0.001 |
| 30 | 3 | 1.833 | 1 | 1.832 | | |
| 32 | 6 | 1.776 | 5 | 1.774 | 10 | 1.776±0.001 |
| 33 | | | | 1.746 | 3 | 1.748±0.001 |
| 34 | 8 | 1.724 | 6 | 1.722 | 5 | 1.723±0.001 |
| 35 | | | 2 | 1.697 | 4 | 1.697±0.001 |
| 36 | 8 | 1.673 | 6 | 1.672 | 7 | 1.673±0.001 |
| 37 | | | 1 | 1.649 | 1 | 1.650±0.001 |
| 38 | 5 | 1.630 | 3 | 1.628 | 3 | 1.629±0.001 |
| 40 | 2 | 1.589 | | | | |
| 41 | | | 4 | 1.568 | 6 | 1.569±0.001 |
| 42 | 2 | 1.551 | 2 | 1.550 | 2 | 1.550±0.001 |
| 43 | | | | | 2 | 1.531±0.001 |
| 44 | 1 | 1.518 | | | | |
| 45 | | | 2 | 1.497 | 3 | 1.497±0.001 |
| 46 | 5 | 1.482 | 4 | 1.480 | 5 | 1.481±0.001 |
| 49 | | | | | 2 | 1.435±0.001 |
| 50 | 3 | 1.421 | | | 1 | 1.420±0.001 |
| 51 | | | | | 2 | 1.407±0.001 |
| 52 | 2 | 1.393 | 1 | 1.392 | 1 | 1.392±0.001 |
| 53 | | | 2 | 1.378 | 2 | 1.379±0.001 |
| 54 | 5 | 1.367 | 4 | 1.366 | 6 | 1.367±0.001 |
| 56 | 1 | 1.342 | | | | |
| 58 | 2 | 1.319 | | | | |
| 59 | | | | | 3 | 1.308±0.001 |
| 61 | | | 3 | 1.285 | 2 | 1.286±0.001 |
| 62 | 6 | 1.276 | 4 | 1.275 | 4 | 1.276±0.001 |
| 66 | 2 | 1.238 | | | 3 | 1.236±0.001 |
| 68 | 1 | 1.218 | | | | |
| 70 | 1 | 1.202 | | | | |
| | Cubic $a_0$= 10.05 A. | | Cubic $a_0$= 10.03 A. | | Cubic $a_0$=10.04 A. | |

| CaB | | | $Li_2B$ | | |
|---|---|---|---|---|---|
| Miller indices $h, k, l$ | 100 $I/I_0$ | $d$ (in A.) | Miller indices $h, k, l$ | 100 $I/I_0$ | $d$ (in A.) |
| 101 | 96 | 7.14 | 101 or 110 | 80 | 7.07 |
| | | | 111 | 7 | 5.76 |
| 200 | 61 | 4.96 | 200 | 49 | 5.02 |
| | | | 002 | 26 | 4.91 |
| | | | 102 | 13 | 4.416 |
| 112 | 72 | 4.152 | 112 | 11 | 4.042 |
| 121 | 25 | 4.075 | 211 | 80 | 4.097 |
| | | | 202 or 220 | 4 | 3.530 |
| | | | 212 | 21 | 3.322 |
| 103 | 40 | 3.246 | 103 | 58 | 3.115 |
| 301 | 100 | 3.148 | 301 or 310 | 100 | 3.184 |
| | | | 311 | 7 | 3.031 |
| | | | 113 | 6 | 2.979 |
| 222 | 4 | 2.898 | | | |
| | | | 302 | 4 | 2.776 |
| | | | 203 | 5 | 2.750 |
| 123 | 6 | 2.714 | 321 | 38 | 2.687 |
| 132 | 67 | 2.677 | 213 | 20 | 2.651 |
| 004 | 9 | 2.575 | | | |
| | | | | 5 | 2.525 |
| | | | | 6 | 2.431 |
| | | | | 2.5 | 2.387 |
| 411 | 8 | 2.342 | | 2 | 2.256 |
| | | | | 5 | 2.202 |
| | | | | 5 | 2.159 |
| | | | | 1 | 2.128 |
| | | | | 2.5 | 2.051 |
| | | | | 5 | 1.979 |
| | | | | 2 | 1.852 |
| | | | | 4 | 1.784 |
| | | | | 6 | 1.758 |
| | | | | 6 | 1.720 |
| 005 | 5 | 2.075 | | | |
| 314 | 7 | 1.991 | | | |
| 431 | 5 | 1.946 | | | |

TABLE II—Continued

| CaB | | | Li₂B | | |
|---|---|---|---|---|---|
| Miller indices h, k, l | 100 I/I₀ | d (in A.) | Miller indices h, k, l | 100 I/II | d (in A.) |
| 521 | 5 | 1.819 | | | |
| 404 | 8 | 1.786 | | | |
| 440 | 6 | 1.749 | | | |
| 006 | 6 | 1.717 | | | |
| 600 | 5 | 1.653 | | | |
| Tetragonal | $a=9.92$ A. $c=10.30$ A. | | Tetragonal | $a=10.08$ A. $c=9.91$ A. | |

The more significant $d$ values for zeolite B are given in Table III.

TABLE III
$d$ VALUE OF REFLECTION IN A.

7.10±0.1
4.97±0.1
4.10±0.1
3.18±0.1
2.68±0.08

Zeolite B may be defined as a synthetic crystalline alumino-silicate having an X-ray powder diffraction pattern characterized by at least those reflections set forth in Table III.

Table II shows that the relative intensities and positions of the lines are substantially the same for the various ion-exchanged forms of zeolite B. While the patterns for the calcium and lithium forms of zeolite B in some cases show double lines where the patterns for the sodium, magnesium and zinc forms of zeolite B show single lines, it is apparent from the patterns that these materials have basically the same crystal structure. Slight differences in the X-ray patterns of the various ion-exchanged forms of zeolite B are attributable to the presence of cations of several sizes in the various forms of zeolite B. In the case of calcium exchanged zeolite B, a slight expansion occurs along one axis and a slight contraction along the other two axes, changing the system from cubic to tetragonal. In the case of lithium exchanged zeolite B, a slight contraction occurs along one axis and expansion along the other two axes likewise changing the crystal system from cubic to tetragonal. The arrangement of the silicon, oxygen, and aluminum atoms in the crystals of these two materials is still essentially the same as in the original sodium zeolite B. Similar changes are to be expected with other ion-exchanged forms.

The particular X-ray technique and/or apparatus employed, the humidity, the temperature, the orientation of the powder crystals and their size and other variables, all of which are well known and understood to those skilled in the art of X-ray crystallography or diffraction, can cause some variations in the intensities and positions of the lines. These changes, even in those few instances where they seemingly become large, pose no problem to the skilled X-ray crystallographer in establishing identities. Thus, the X-ray data given herein to identify the zeolite B lattice, are not to exclude those materials, which, due to some variable mentioned or otherwise known to those skilled in the art, fail to show all of the lines, or show a few extra ones that are permissible in the crystal system of zeolite B, or show a slight shift in position of the lines, so as to give a slightly larger or smaller lattice parameter, or a splitting of the lines caused by a slight uneven expansion of the unit cell along its three axes.

Occasionally, additional lines not belonging to the pattern for zeolite B, appear in a pattern along with the X-ray lines characteristic of zeolite B. This is an indication that one or more additional crystalline materials are mixed with zeolite B in the sample being tested. Frequently these additional materials can be identified as initial reactants in the synthesis of the zeolite, or as other crystalline substances. When zeolite B is heat treated at temperatures of between 100° C. and 600° C. in the presence of water vapor or other gases or vapors, the relative intensities of the lines in the X-ray pattern may be appreciably changed from those existing in the unactivated zeolite B patterns. Small changes in line positions may also occur under these conditions. These changes in no way hinder the identification of these X-ray patterns as belonging to zeolite B.

The zeolite contemplated herein exhibits adsorbent properties that are unique among known adsorbents. The common adsorbents like charcoal and silica gel show adsorption selectivities based primarily on the boiling point or critical temperature of the adsorbate. The activated zeolite B on the other hand exhibits a selectivity based on the size and shape of the adsorbate molecules. Another characteristic of zeolite B that contributes to its unique position among adsorbents is its property of adsorbing large quantities of adsorbate at very low pressures, or at very low partial pressures, or at very low concentrations. One or a combination of these adsorption characteristics or others make zeolite B useful for numerous gas and liquid separation processes where adsorbents are not now employed. The use of zeolite B permits more efficient and more economical operation of numerous processes now employing other adsorbents, or in which the use of other adsorbents is contemplated.

The size of the pores in zeolite B is such that water is readily adsorbed but the molecules much larger than water are not adsorbed to any appreciable extent. This is shown in the following table, with a series of adsorbates of which water is the smallest molecule. Relative data for silica gel and charcoal is included in the table. This table also shows the differences that can be brought about in adsorptive properties by ion exchange of zeolite B. The zeolite B with which the data in the table was collected was activated by heating the zeolite B to a temperature of 350° C. at a pressure of less than about 0.1 millimeter of mercury absolute. The pressure listed in the table is the partial pressure of the adsorbate at the specified temperature. The term "Weight Percent Adsorbed" refers to the percentage increase in the weight of the adsorbent. Unless otherwise stated these definitions and conditions apply to all adsorption data in the application.

| Adsorbate | Temperature (° C.) | Pressure (mm. Hg.) | Weight Percent adsorbed | | | |
|---|---|---|---|---|---|---|
| | | | Na₂B | CaB | Silica gel | Charcoal |
| Water | 25 | 4.6 | 17.7 | 7.8 | 11.4 | 2.7 |
| | 25 | 17 | 23.6 | -------- | 26.6 | 7.8 |
| | 25 | 24 | 24.4 | 17.5 | 42.9 | 24.1 |
| Oxygen | −196 | 15 | 0.0 | 1.0 | 25.9 | 35.5 |
| Nitrogen | −196 | 37 | 0.6 | 0.6 | 19.1 | 23.0 |
| | −196 | 700 | -------- | 0.4 | -------- | -------- |
| Argon | −196 | 6 | -------- | 0.3 | -------- | -------- |
| | −196 | 140 | -------- | 1.1 | -------- | -------- |
| Ethyl alcohol | 25 | 33 | 0.1 | -------- | 26.7 | 24.8 |
| Propane | 25 | 164 | 0.0 | -------- | 1.7 | 11.0 |
| Ethylene | 25 | 208 | 0.3 | -------- | 1.5 | 3.9 |
| | 25 | 700 | -------- | 0.9 | -------- | -------- |
| Propylene | 25 | 187 | 0.0 | -------- | 4.5 | 11.9 |
| Butene-1 | 25 | 137 | 0.1 | -------- | 9.9 | 16.4 |
| Acetylene | 25 | 570 | 0.4 | -------- | 3.8 | 4.6 |
| Butane | 25 | 76 | -------- | 0.2 | -------- | -------- |
| n-Hexane | 25 | 98 | -------- | 0.9 | -------- | -------- |
| i-Butane | 25 | 400 | 0 | 0.0 | 11.8 | 27.2 |

The property of zeolite B of adsorbing water but not significant quantites of larger molecules permits the use of zeolite B to remove water from mixtures where adsorption of the other components is not desired. For instance, sodium zeolite B can be used to dehydrate natural gas without co-adsorption of hydrocarbons and a concomitant reduction in its capacity for water. Absolutely pure ethyl alcohol can be prepared by adsorbing on zeolite B the water from a 95 percent ethanol, 5 percent water constant boiling mixture.

In one test three grams of activated sodium zeolite B were placed in 6 cc. of a 90 percent ethanol–10 percent water mixture and shaken. When the zeolite had settled, analyses of the supernatant liquid showed 98.7 percent ethyl alcohol. More complete removal of the water requires only additional shaking with more zeolite B. This not only illustrates the practical application of the zeolite but shows that the larger ethanol molecules do not effectively clog the pores of zeolite B to the adsorption of the smaller water molecules. This property may be used to remove water from a constant boiling ethanol-water mixture.

Another unique characteristic of zeolite B is its property of adsorbing large quantities of adsorbate at low partial pressures or concentrations. This is shown in the following table where the adsorption of water on silica gel, Na$_2$B, and charcoal is compared.

| Adsorbate | Temperature (° C.) | Pressure (mm. Hg) | Weight percent adsorbed | | |
|---|---|---|---|---|---|
| | | | Na$_2$B | Silica gel | Charcoal |
| Water | 25 | 0.1 | 4.6 | 2.1 | 0.1 |
| | 25 | 1.0 | 12.4 | 3.9 | 0.1 |
| | 25 | 2.0 | 15.7 | 5.3 | 0.2 |
| | 25 | 4.6 | 17.7 | 11.4 | 2.7 |
| | 25 | 24.0 | 24.4 | 42.9 | 24.1 |

Zeolite B may be used for the more complete removal of water from gases or liquids than can either of the standard physical adsorbents for which data is reported above.

Zeolite B may be activated originally by heating it in air or vacuum to temperatures of up to 600° C. A temperature of about 350° C. is preferred. The desorption of an adsorbate from zeolite B is effected by either one or a combination of raising the temperature and reducing the pressure, partial pressure or concentration of the adsorbate in contact with the adsorbent. A purge gas alone or in combination with elevated temperature may also be employed in activating or desorbing zeolite B.

Zeolite B may be used as an adsorbent for the purposes indicated above in any suitable form. For example, a column of powdered crystalline material has given excellent results as has a pelleted form obtained by pressing into pellets a mixture of zeolite B and a suitable bonding agent such as clay.

This application is a continuation-in-part application of Serial No. 400,387, filed December 24, 1953, and now abandoned.

What is claimed is:

1. Crystalline synthetic metal alumino-silicate having a composition expressed in terms of oxides as follows:

$$1.0 \pm 0.2 \frac{M_2O}{n} : Al_2O_3 : 3.5 \pm 1.5 SiO_2 : YH_2O$$

wherein "M" represents at least one cation having a valence of not more than three, "$n$" represents the valence of "M," and "Y" may be any value up to about 6, the atoms of said metal alumino-silicate being arranged in a unit cell in such a manner that the more significant lines of the X-ray powder diffraction pattern of the metal alumino-silicate are essentially the same as that shown in the following table:

$d$ VALUE OF REFLECTIONS IN A.
7.10±0.1
4.97±0.1
4.10±0.1
3.18±0.1
2.68±0.08

2. Crystalline synthetic sodium-alumino-silicate the atoms of which are arranged in a unit cell in such a manner that the X-ray powder diffraction pattern of the silicate is substantially the same as that shown in the following table:

SODIUM ZEOLITE B

| 100 $I/I_0$ | $d$ (in A.) | 100 $I/I_0$ | $d$ (in A.) |
|---|---|---|---|
| 74 | 7.10 | 8 | 1.673 |
| 41 | 5.02 | 5 | 1.630 |
| 69 | 4.101 | 2 | 1.589 |
| 100 | 3.176 | 2 | 1.551 |
| 7 | 2.899 | 1 | 1.518 |
| 56 | 2.684 | 5 | 1.482 |
| 5 | 2.518 | 3 | 1.421 |
| 10 | 2.366 | 2 | 1.393 |
| 2 | 2.246 | 5 | 1.367 |
| 1 | 2.142 | 1 | 1.342 |
| 4 | 2.051 | 2 | 1.319 |
| 11 | 1.971 | 6 | 1.276 |
| 3 | 1.833 | 2 | 1.238 |
| 6 | 1.776 | 1 | 1.218 |
| 8 | 1.724 | 1 | 1.202 | and which has a composition expressed in terms of oxides as follows:

$$1.0 \pm 0.2 Na_2O : Al_2O_3 : 3.5 \pm 1.5 SiO_2 : YH_2O$$

wherein "Y" may be any value up to about 6.

3. Synthetic crystalline metal alumino-silicate having a composition expressed in terms of oxides as follows:

$$1.0 \pm 0.2 \frac{M_2O}{n} : Al_2O_3 : 3.5 \pm 1.5 SiO_2 : YH_2O$$

wherein "M" represents at least one cation having a valence of not more than 3, "$n$" represents the valence of "M," and "Y" may be any value up to about 6, the atoms of said metal alumino-silicate being arranged in a unit cell in such a manner that the more significant lines of the X-ray powder diffraction pattern of the metal alumino-silicate are essentially the same as that shown in the following table:

$d$ VALUE OF REFLECTIONS IN A.
7.10±0.1
4.97±0.1
4.10±0.1
3.18±0.1
2.68±0.08 said crystalline metal alumino-silicate being between 0.01 micron and 100 microns in size.

4. Crystalline synthetic metal alumino silicate having a composition expressed in terms of oxides as follows:

$$1.0 \pm 0.2 \frac{M_2O}{n} : Al_2O_3 : 3.5 \pm 1.5 SiO_2 : YH_2O$$

wherein "M" represents at least one cation having a valence of not more than three, "$n$" represents the valence of "M," and "Y" may be any value up to about 6, the atoms of said silicate being arranged in a unit cell in such a manner that the more significant lines of the X-ray powder diffraction pattern of the silicate are essentially the same as that shown in the following table:

$d$ VALUE OF REFLECTIONS IN A.
7.10±0.1
4.97±0.1
4.10±0.1
3.18±0.1
2.68±0.08 said silicate being further characterized in that at a temperature of about 25° C. a substantial amount of water but less than about 2 percent of ethanol by weight of silicate is adsorbed by said silicate.

5. Method of preparing a sodium-alumino-silicate having atoms arranged in a unit cell in such a manner that the more significant lines of the X-ray powder diffraction pattern of the silicate are essentially the same as that shown in the following table:

*d* VALUE OF REFLECTIONS IN A.
7.10±0.1
4.97±0.1
4.10±0.1
3.18±0.1
2.68±0.08 which comprises preparing a sodium-alumino-silicate-water mixture whose compositions, expressed in terms of oxide-mole ratios, falls within about the ranges:

$Na_2O/SiO_2$ _____ 0.38–0.61
$SiO_2/Al_2O_3$ _____ 3.3–20
$H_2O/Na_2O$ _____ 10–50 maintaining the mixture at a temperature within the range of from about 75° C. to 150° C. until crystals as previously defined are formed; and separating the crystals from the mother liquor.

6. Method of preparing a sodium-alumino-silicate having atoms arranged in a unit cell in such a manner that the X-ray powder diffraction pattern of the silicate is essentially the same as that shown in the following table:

SODIUM ZEOLITE B

| 100 $I/I_0$ | *d* (in A.) | 100 $I/I_0$ | *d* (in A.) |
|---|---|---|---|
| 74 | 7.10 | 8 | 1.673 |
| 41 | 5.02 | 5 | 1.630 |
| 69 | 4.101 | 2 | 1.589 |
| 100 | 3.176 | 2 | 1.551 |
| 7 | 2.899 | 1 | 1.518 |
| 56 | 2.684 | 5 | 1.482 |
| 5 | 2.518 | 3 | 1.421 |
| 10 | 2.366 | 2 | 1.393 |
| 2 | 2.246 | 5 | 1.367 |
| 1 | 2.142 | 1 | 1.342 |
| 4 | 2.051 | 2 | 1.319 |
| 11 | 1.971 | 6 | 1.276 |
| 3 | 1.833 | 2 | 1.238 |
| 6 | 1.776 | 1 | 1.218 |
| 8 | 1.724 | 1 | 1.202 | which comprises preparing a sodium-alumino-silicate-water mixture whose composition, expressed in terms of oxide-mole ratios, falls within the ranges:

$Na_2O/SiO_2$ _____ 0.38–0.61
$SiO_2/Al_2O_3$ _____ 3.3–20
$H_2O/Na_2O$ _____ 10–50 maintaining the mixture at a temperature within the range of from about 75° C. to 150° C. until crystals as previously defined are formed; and separating the crystals from the mother liquor.

7. Process in accordance with claim 6 wherein said temperature is about 100° C.

8. Process in accordance with claim 6 wherein the silica source for the sodium-alumino-silicate mixture is selected from the group consisting of sodium silicate, silica gel and silicic acid.

9. Crystalline synthetic metal-alumino-silicate having a composition expressed in terms of oxides as follows:

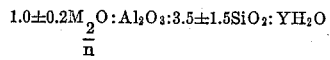

wherein "M" is selected from the group consisting of sodium, magnesium and zinc, "*n*" represents the valence of "M," and "Y" may be any value up to about 6, the atoms of said silicate being arranged in a cubic unit cell of $a°$ of 10.0 A.±0.2 A. in such a manner that the more significant lines of the X-ray powder diffraction pattern of the silicate are substantially the same as that shown in the folowing table:

*d*. VALUE OF REFLECTIONS IN A.
7.10±0.1
4.97±0.1
4.10±0.1
3.18±0.1
2.68±0.08

10. Crystalline synthetic metal-alumino-silicate having a composition expressed in terms of oxides as follows:

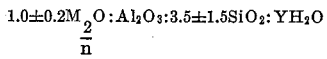

wherein "M" is selected from the group consisting of calcium and lithium, "*n*" represents the valence of "M," and "Y" may be any value up to about 6, the atoms of said silicate being arranged in a tetragonal unit cell in which the *a*-axis is 10.00 A.±0.08 A. and the *c*-axis is 10.05 A.±0.25 A. in such a manner that the more significant lines of the X-ray powder diffraction pattern of the silicate are substantially the same as that shown in the following table:

*d*. VALUE OF REFLECTIONS IN A.
7.10±0.1
4.97±0.1
4.10±0.1
3.18±0.1
2.68±0.08

11. A crystalline synthetic sodium-alumino-silicate as described in claim 2 wherein the unit cell is a cubic unit cell of $a°$ of 10.0 A.±0.2 A.

References Cited in the file of this patent
UNITED STATES PATENTS 2,306,610 Barrer _____ Dec. 29, 1942
2,413,134 Barrer _____ Dec. 24, 1946

OTHER REFERENCES

Barrer et al.: "J. Chem. Soc." pp. 1561–1571, May 1952.

Mellor: Comprehensive Treatise on Inorganic and Theoretical Chemistry, vol. 6, pages 575, 766, 767, Longmans, Green and Co., New York, 1925.